(No Model.)
S. W. JOHNSON.
ICE MACHINE.
No. 288,063. Patented Nov. 6, 1883.
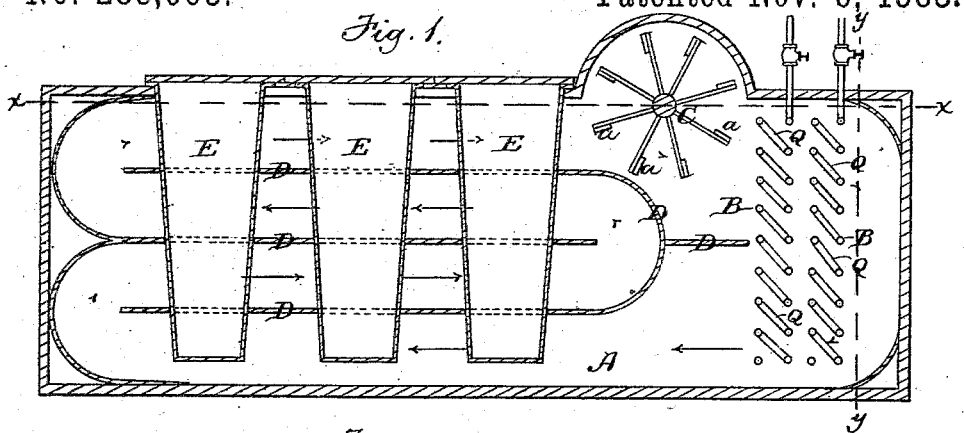
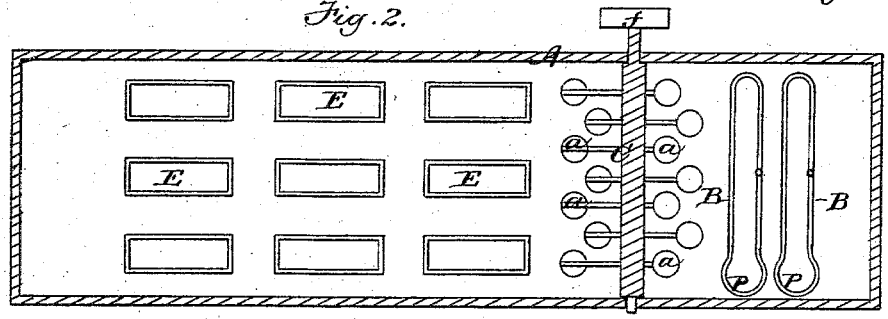
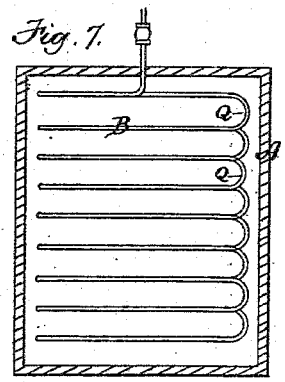
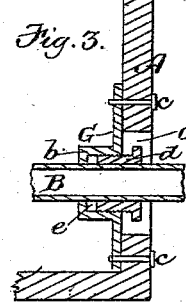
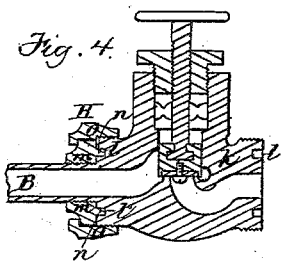
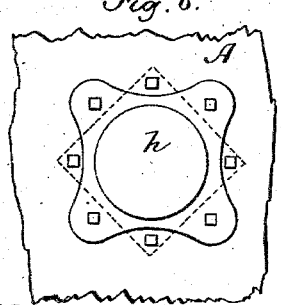
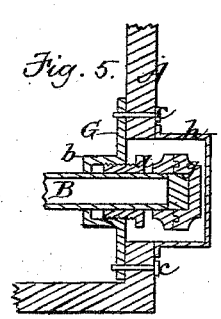
Witnesses.
Inventor
S. W. Johnson

UNITED STATES PATENT OFFICE.

SAMUEL WATSON JOHNSON, OF BELMONT, MASSACHUSETTS.

ICE-MACHINE.

SPECIFICATION forming part of Letters Patent No. 288,063, dated November 6, 1883.

Application filed August 21, 1883. (No model.)

*To all whom it may concern:*

Be it known that I, SAMUEL W. JOHNSON, of Belmont, in the county of Middlesex and State of Massachusetts, have invented certain Improvements in Ice-Machines, of which the following is a specification.

This invention relates to machines in which ice is produced in pans containing the fresh water to be frozen by the action of brine contained in a tank in which said pans are immersed, the brine being cooled below the freezing-point by coils of pipe passing through it, the cold in the pipes being produced by the expansion of a liquefiable gas from which the heat has been expelled by compression in a gas-compressor.

The invention has for its object, first, to produce ice which shall be clear and free from air-bubbles; second, to produce an even circulation of the brine in every part of the machine; third, to provide means by which sections of the refrigerating-coil can be removed for repairs without stopping the machine; fourth, to reduce the number of joints, and at the same time to provide means for readily taking the apparatus apart for repairs, &c.; fifth, to provide an improved form of refrigerating-coil.

To these ends my invention consists in the improvements which I will now proceed to describe and claim.

Of the accompanying drawings, forming a part of this specification, Figure 1 represents a vertical section of a brine-tank provided with my improvements. Fig. 2 represents a horizontal section on line $x\,x$, Fig. 1. Fig. 3 represents an enlarged section of a portion of one of the sides of the tank, showing my device for removing the coil without letting out the brine. Fig. 4 represents a combined valve and union-joint used with my apparatus. Fig. 5 represents a vertical section, similar to that shown in Fig. 3, showing the end of refrigerating coil or pipe ready for removal from the tank. Fig. 6 represents a side elevation of the part shown in Fig. 5, showing my method of attaching the flanges of $b$ and $h$ to the brine-tank. Fig. 7 represents a cross-section of brine-tank, taken at $y\,y$, Fig. 1.

The same letters of reference indicate the same parts in each of the figures.

In carrying out my invention I construct a tank, A, Fig. 1, of wood or other suitable material. Said tank is filled with water containing salt, chloride of magnesium, or other substance capable of arresting the freezing process.

B B represent the refrigerating-coil into which the chemical refrigerant is expanded, said refrigerant producing intense cold and causing the pipes to absorb any heat that may exist in the brine surrounding them.

C represents an agitator which keeps the brine in motion.

D D represent partitions extending the whole width of the tank, and forming a serpentine channel, which causes the brine, when set in a backward and forward motion by the agitator, to follow the upward serpentine course indicated by the arrows.

E E represent galvanized-iron pans of the usual form, which are filled with the water to be frozen.

The refrigerating-coils are located in a space at one end of the tank A, which space communicates both with the upper and with the lower end of the serpentine channel, as shown in Fig. 1. Holes are cut in the top of the brine-tank for the reception of the ice-pans, and corresponding holes are cut in the partitions D for the same purpose.

It will be seen that the partitions D cause the brine to act first on the lower portions of the pans and then at points successively higher until the upper portions of the pans are reached. The object of this arrangement is to make the ice clear and solid by causing the brine as it comes from the refrigerating-coil to first act on the bottom of the pans and to gradually ascend as it grows warmed, by which means the refrigerating process is caused to commence at the bottom of the pan and proceed upwardly. This allows the air to escape as fast as the ice is formed, while by the common process the top of the pan is covered with ice before the middle is frozen, and the air, having no means of escape, remains in the ice.

The agitator C consists of a shaft in which are inserted a number of separate paddles, *a a*, extending the whole width of the tank. The agitator not only sets the brine in motion, but thoroughly agitates every part of it, thereby preventing any deposit of salt and producing uniform results in every part of the machine, which is not the case with the pumps and propellers in common use, which produce currents in some parts of the machine and have no effect on other parts.

*f* is a pulley to drive the agitator.

It will be seen that the agitator is so arranged that it draws the brine from the upper end of the serpentine channel formed by the partitions D and forces it through the refrigerating-coils and into the lower end of said channel. By this arrangement the brine is thoroughly circulated and cooled.

For the purpose of enabling the refrigerating-coil to be removed from the tank without allowing the brine to escape, I have provided a flanged collar, *b*, which is made fast to the tank by the bolts *c c*, and covers an opening in the tank through which said pipe passes.

*d* represents a gland, which screws into the collar *b* and compresses the packing *e e* between the pipe B and the collar *b*.

When the coil is taken out, it is detached from the valve at H. The pipe is then pushed back against the gland *d* and the end secured by the cap *g*. The cap *h* is then bolted on, as shown in Fig. 5. The bolts *c c* are then removed and the bolt-holes are plugged. The coil is then ready for removal. It is replaced in the same manner, the only loss occurring being the brine in the cap *h*.

I have provided improved means for connecting the different parts of the refrigerating apparatus. *k* is a valve having a thread on the outside of each end, instead of inside, as in other valves. *l* is a recess cut in the end of the valve for the reception of a rubber gasket. *m* is a half-union screwed on the end of the pipe B, and having a boss, *n*, which fits closely into the recess *l*, so that the rubber cannot squeeze out on either side of it. *o* is a union-nut of the ordinary form connecting the half-union *m* with the valve *k*. The advantage of this arrangement is that a joint is formed on each side of the valve which is perfectly gas-tight, and at the same time easily taken apart, leaving the valve attached to either section of the pipes which may be desired. This is a great convenience, and can only be obtained at present by placing a union on each side of the valve, with a nipple between, which doubles the number of joints and the chances of leakage.

I do not herein claim the last-described improvement, but reserve the same for a future application.

The refrigerating-coil B is formed by running a pipe horizontally across the tank, then bending it laterally at an enlarged curve, as shown at P P, Fig. 2, returning it parallel and on a level with the first pipe to the side where it entered, then bending it diagonally downward, as shown at *q*, Fig. 1, so that it turns under the first pipe. This is repeated till the coil has the desired extent. The advantage of this form of coil is that the pipes are kept at a uniform distance apart, the pipe can be thoroughly drained, and the bends or curves are made as long as possible, thereby lessening the liability of weakening the pipe by bending it. It is well known that in bending a pipe the strain or weakening of the pipe is proportioned directly to the length of the curve, a short curve being much more injurious than a longer one.

I claim—

1. The improved method of making ice in pans or receptacles, the same consisting in conducting a refrigerating-liquid in a serpentine or backward and forward course along the external surfaces of said tanks, said liquid acting on the pans first at their lower portions and then at successively higher points, whereby the freezing action is caused to commence at the bottoms of the pans, as set forth.

2. In an ice-machine, the combination of a tank provided with partitions D, forming a serpentine channel adapted to direct a refrigerating-liquid in an ascending serpentine course, and having suitable apertures, an agitator adapted to circulate the liquid in said channel, and a series of pans inserted in said apertures and surrounded by the refrigerating-liquid, the latter being caused by the partitions D to act on the pans first at their lower portions, as set forth.

3. In an ice-machine, the combination of the tank having the partitions D, forming a serpentine channel, the pans E, inserted in orifices in said partitions and surrounded by said channel, the refrigerating-coils located in a space at one end of the series of pans E, said space communicating with both ends of said serpentine channel, and the rotary agitator C, arranged to draw the refrigerating-liquid from the upper end of said channel and force it through the refrigerating-coils and into the lower end of said channel, as set forth.

4. The combination, with the tank, of the agitator consisting of a shaft provided with independent paddles, as set forth.

5. The tank provided with an opening, *o*, and a collar, *b*, covering said opening, and an internally-threaded orifice for the passage of a refrigerating-pipe, and a threaded gland or follower adapted to work in said opening around the pipe and hold a packing in said collar, as set forth.

6. The combination, with the tank having the opening *o*, and the collar *b*, covering said opening and adapted to receive a refrigerating-pipe, of the cap *h*, adapted to be applied to the outside of the tank to cover the opening *o*, and permit the removal of the pipe without loss of liquid from the tank, as set forth.

7. The combination, with the tank, of the refrigerator-pipe B, having the enlarged end curves, P, the sections between said curves being practically parallel, and the diagonal downward curves Q, all substantially as set forth.

In testimony whereof I have signed my name to this specification, in the presence of two subscribing witnesses, this 15th day of August, 1883.

SAMUEL WATSON JOHNSON.

Witnesses:
  C. F. BROWN,
  A. L. WHITE.